United States Patent [19]

Johnson et al.

[11] Patent Number: 4,903,919
[45] Date of Patent: Feb. 27, 1990

[54] APPARATUS AND METHOD FOR DOCKING SPACECRAFT

[75] Inventors: Caldwell C. Johnson; Maxime A. Faget, both of Dickinson, Tex.

[73] Assignee: Space Industries, Inc., Webster, Tex.

[21] Appl. No.: 125,993

[22] Filed: Nov. 27, 1987

[51] Int. Cl.$^4$ .............................................. B64G 1/64
[52] U.S. Cl. ...................................... 244/161; 244/159
[58] Field of Search ..................... 244/158 R, 159, 161

[56] References Cited

U.S. PATENT DOCUMENTS

| | | |
|---|---|---|
| 1,866,438 | 7/1932 | Williamson . |
| 3,332,640 | 7/1967 | Nesheim ............................... 244/159 |
| 3,401,903 | 9/1968 | Bohr ..................................... 244/161 |
| 3,855,806 | 12/1974 | Le Therisien . |
| 3,910,533 | 10/1975 | Cheatham ............................ 244/161 |
| 3,952,976 | 4/1976 | Fletcher et al. . |
| 3,967,462 | 7/1976 | DeJong . |
| 3,987,742 | 10/1976 | Boisrayon et al. . |
| 4,057,207 | 11/1977 | Hogan .................................. 244/159 |
| 4,508,296 | 4/1985 | Clark . |
| 4,715,566 | 12/1987 | Nobles .................................. 244/159 |
| 4,728,060 | 3/1988 | Cohen ................................... 244/161 |

FOREIGN PATENT DOCUMENTS

| | | |
|---|---|---|
| 721000 | 2/1932 | France . |
| 1556078 | 11/1979 | United Kingdom . |
| 1559566 | 1/1980 | United Kingdom . |

OTHER PUBLICATIONS

Rockwell International Brochure, "Moving into Space", published Apr. 1985 (574-F-33).
K. Clausen et al., "Spacelab and its Services to Users", ESA Bulletin, No. 19, pp. 47-55 (Aug. 1979).

Primary Examiner—Galen L. Barefoot
Attorney, Agent, or Firm—Robbins & Laramie

[57] ABSTRACT

A docking apparatus for coupling two spacecraft comprises a rigid pressure vessel having an interior passage, and first and second docking ports communicating with said interior passage. The planes of the docking ports form an oblique angle with respect to each other, causing the docked spacecraft to assume a canted or inclined relationship. The cant angle eliminates mechanical interference between the adjoining structures of the docked spacecraft. Methods for carrying out docking between spacecraft are also disclosed.

18 Claims, 5 Drawing Sheets

APPARATUS AND METHOD FOR DOCKING SPACECRAFT

BACKGROUND OF THE INVENTION:

This invention relates generally to a docking apparatus and method for spacecraft, and is particularly concerned with a docking apparatus and method enabling two spacecraft to be docked in a manner such that the first spacecraft is canted with respect to the second spacecraft so that mechanical interference between the two spacecraft is avoided.

Various types of apparatus have been proposed for accomplishing a temporary or permanent mechanical connection between two spacecraft. Such apparatus offer a practical means for assembly of a spacecraft, for the logistic support and transfer of crew members while maintaining a pressurized environment, and for the mutual support of two spacecraft by sharing their individual facilities and capabilities.

In its nominal configuration, a spacecraft typically has no means for docking with another spacecraft. For example, the Space Transportation System (also referred to as the Space Shuttle Orbiter) developed in the United States by the National Aeronautics and Space Administration (NASA) initially included plans for a docking adapter to be installed when needed in the payload bay of the Shuttle vehicle to provide a mechanical means for docking with another spacecraft and a pressurized passageway for crew transfer. The planned docking adapter was to include a pressure-tight port which would be attached to the exit port at the rear of the Shuttle vehicle cabin, and a further port to effect a structural and pressure-tight link with a similar mechanism on a second spacecraft. The docking adapter was to have a structural support of the same type as that used for payloads placed in the payload bay, as well as an additional exit port into the payload bay. Prior to docking, the docking adapter was to be telescoped vertically from its stowed position beneath the payload bay doors to a point beyond the top of the Shuttle vehicle cabin, in order to establish a clearance between the Shuttle vehicle and the docking spacecraft. At the end of the docking period, and after the spacecraft was released, the mechanism was to be retracted to its stowed position to allow the payload bay doors to be closed. However, the extension and retraction mechanism was seen as an objectionable liability in that it would be heavy and costly to develop; there was a risk in that a failure of the adapter to retract would preclude the closing of the payload bay doors and hence would imperil the Shuttle vehicle's return to earth. For various reasons, the plans for a retractable docking adapter were never realized by NASA.

Accordingly, a need has arisen for a safe and reliable docking apparatus to enable docking operations between two spacecraft. Such operations include the passage of crew members between the spacecraft for crew-tended operations and logistical support, the assembly or structural expansion of spacecraft, the addition or exchange of modules containing expendable supplies and equipment needed for space-borne experiments and manufacturing processes, and the on-orbit repair and maintenance of spacecraft. In the future, large free-flying spacecraft requiring assembly and resupply in orbit, such as the proposed NASA Space Station, will require all of the above operations to be provided by a space vehicle and crew on a frequent basis. As these operations are to be implemented by crew members moving between two spacecraft, they are best accomplished in what is known as a shirt-sleeve environment, that is, in a pressurized, earth-like environment that allows unrestricted passage of the crew between spacecraft without the need for pressure suits.

In order to be useful for the operations referred to above, the docking apparatus should preferably meet a number of objectives. One objective is that the docking apparatus be capable of attachment to the airlock compartment of a payload-carrying space vehicle, such as the NASA Space Shuttle, and that it allow unimpeded access to the vehicle's payload bay. Another objective is that the docking apparatus provide for the storage of equipment, supplies, and other items that are necessary to flight operations, and that the passageway within the docking apparatus enable the manual transport of such equipment and supplies by crew members passing through docking apparatus. A further objective is that the entire apparatus be capable of being carried in the payload bay and fully enclosed by the payload bay doors during launch and reentry; however, the apparatus must also provide a spacecraft docking interface that maintains a minimum clearance between the non-docking structures of the two spacecraft at their most proximate points. Another objective is that the docking apparatus must not endanger the closing of the payload bay doors, for such closing is essential to the return flight of the space vehicle. Retractable docking apparatus of the type proposed previously do not meet this objective, because a failure of the apparatus to retract would prevent the payload bay doors from closing and hence would make reentry impossible.

In addition to the objectives noted above, it is desirable that the docking apparatus comprise a load-bearing construction adapted for structural attachment to a payload retention apparatus of the space vehicle in which it is carried. This objective is three-fold. First, the docking apparatus is typically carried into orbit by the space vehicle and thus should be compatible with the existing vehicle payload retention apparatus. Second, the docking apparatus should, through its structure, restrain a docked spacecraft and transmit the inertial load of that spacecraft to the payload retention apparatus. Third, a major portion of the docking apparatus should be detachable from the space vehicle. This is important in cases where the docking apparatus must be disconnected from the space vehicle and remain on the docked spacecraft to reduce the weight burden on subsequent space vehicle flights, or to effect an emergency separation of the docking apparatus from the space vehicle. If these structural objectives are not met, the docking apparatus cannot be safely transported to and from orbit.

It is also desirable to provide a passageway to one or more attached payloads in the payload bay through a tunnel extending from the payload to the docking apparatus. An attached payload, such as the Spacelab payload developed jointly by NASA and the European Space Agency (ESA), can support shirt-sleeve conditions when linked to the cabin of the Shuttle vehicle by such a tunnel. Hence, the need exists for a docking apparatus which can be joined to such a tunnel in order to extend a pressurized passageway to the attached payload.

SUMMARY OF THE INVENTION:

The present invention provides a docking apparatus which overcomes the inherent limitations of previously proposed structures, particularly docking adapters designed for extension and retraction from the payload bay of a space vehicle. In accordance with the invention, a docking apparatus for coupling two spacecraft comprises a rigid pressure vessel having an interior passage, and first and second docking ports carried by the pressure vessel and communicating with the interior passage. The first and second docking ports are positioned on the pressure vessel in a manner such that the planes of the docking ports form an oblique included angle with respect to each other. The oblique included angle between the docking ports causes the two docked spacecraft to assume a canted or inclined relationship with respect to each other, thereby allowing a minimum clearance to be maintained between the two spacecraft without the need for a retractable or collapsible docking mechanism.

In a preferred embodiment of the present invention, the docking apparatus is carried by a spacecraft of the type which comprises a crew cabin, a payload bay, a bulkhead between the crew cabin and payload bay, a port in the bulkhead for allowing crew passage between the crew cabin and payload bay, and at least one payload bay door communicating between the payload bay and the exterior of the spacecraft. The docking apparatus comprises a rigid pressure vessel having first and second ports and an interior passage extending between the ports. The first port communicates with the bulkhead port of the spacecraft, and the second port includes a docking interface for coupling the docking apparatus to a second spacecraft. The first port and the docking interface associated with the second port are positioned on the pressure vessel in a manner such that their respective planes form an oblique included angle with respect to each other. As a consequence of this angle, the dimensions of the docking apparatus can be made such that the docking apparatus is completely enclosed within the payload bay of the first spacecraft when the payload bay door is closed. In this way, retractable or collapsible structures are avoided and the safety of the docking procedure is greatly enhanced.

In a particularly preferred embodiment, the docking apparatus may further comprise a tunnel interface port communicating with the interior of the pressure vessel. The tunnel interface port allows the docking apparatus to be coupled by means of a suitable tunnel to a habitable payload carried in the payload bay of the first spacecraft. When the payload tunnel is not required, a storage canister may be coupled to the tunnel interface port in order to carry equipment and supplies. The docking apparatus may further comprise an egress port communicating between the interior of the pressure vessel and the payload bay of the first spacecraft, in order to allow the crew direct access to the payload bay. The docking apparatus is preferably configured so that it can be secured by the existing payload retention system of the first spacecraft, and preferably includes a support structure that also serves to carry one or more storage tanks used for resupplying the spacecraft.

The present invention is also directed to a method for docking first and second spacecraft, wherein the first spacecraft comprises a crew cabin, a payload bay, a bulkhead between the crew cabin and payload bay, a port in the bulkhead for allowing crew passage between the crew cabin and payload bay, at least one payload bay door opening from the payload bay to the outside of the spacecraft, and a docking apparatus carried in the payload bay of the first spacecraft, the docking apparatus being attached at one end to the bulkhead port of the first spacecraft and being attachable at the other end to a docking port of the second spacecraft. The method comprises the steps of bringing the first and second spacecraft into close proximity, uncovering the docking apparatus by opening the payload bay door of the first spacecraft, maneuvering at least one of the first and second spacecraft in a manner such that the second spacecraft assumes a canted position with respect to the first spacecraft, with a portion of the second spacecraft extending into the open payload bay of the first spacecraft, and coupling the docking port of the second spacecraft to the docking apparatus in order to maintain the second spacecraft in the canted position. Preferably, the first spacecraft includes a remote manipulator arm, and the steps of maneuvering at least one of the first and second spacecraft and coupling the port of the second spacecraft to the docking apparatus are carried out using the remote manipulator arm. The method may also be carried out with the docking apparatus initially attached to the second spacecraft, rather than to the first spacecraft, and a traveling grapple fixture may be included on the second spacecraft in order to assist the docking maneuver.

BRIEF DESCRIPTION OF THE DRAWINGS:

The various objects, advantages, and novel features of the present invention will be more clearly apprehended from the following detailed description when read in conjunction with the appended drawings, in which.

Throughout the drawings, like reference numerals will be used to refer to like parts.

Figure 1:
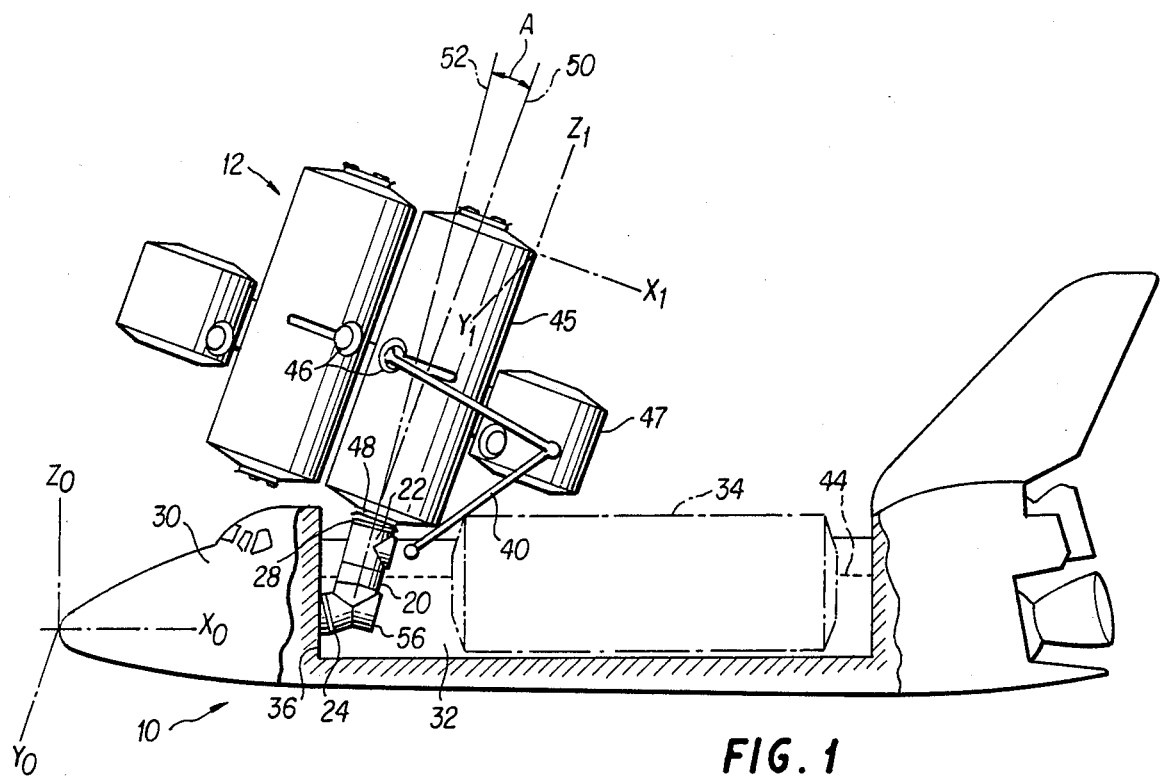
FIG. 1 is a cutaway view of a manned space vehicle equipped with a docking apparatus constructed in accordance with the present invention, shown at the onset of docking with a man-tended space platform.
Figure 2:
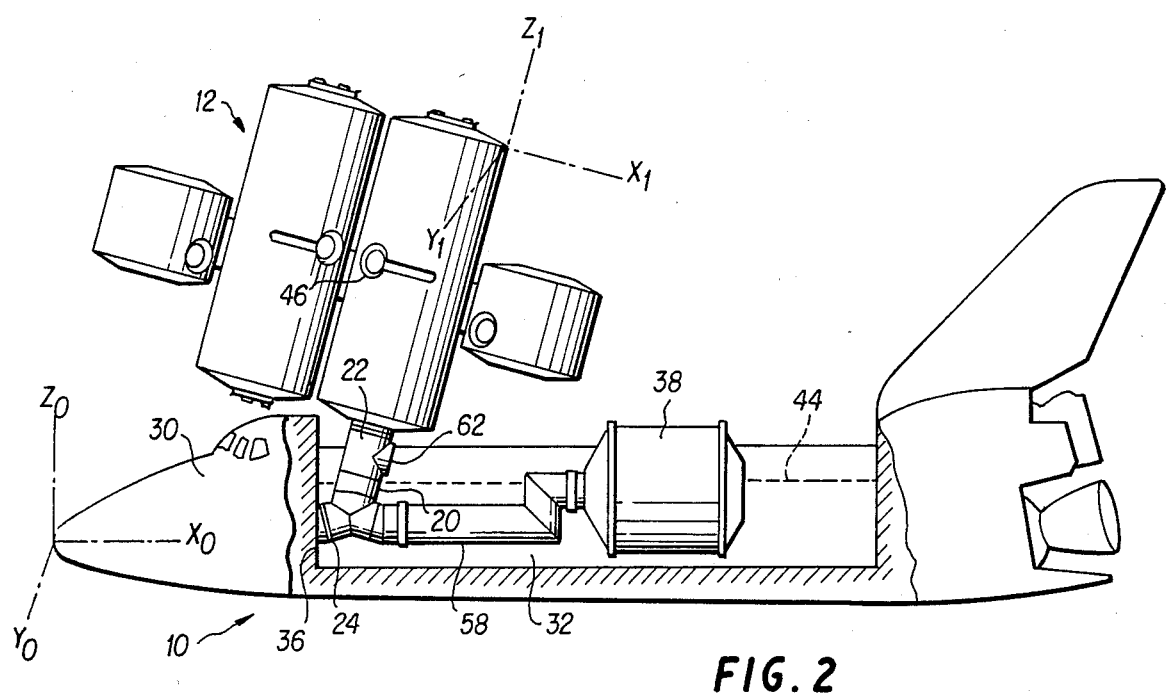
FIG. 2 is a cutaway view similar to that of FIG. 1, illustrating the space vehicle fully docked with the space platform, and further illustrating a payload tunnel connected to the docking apparatus.

DETAILED DESCRIPTION OF THE PREFERRED EMBODIMENT:

FIGS. 1 and 2 illustrate a docking maneuver between two spacecraft 10 and 12 using a docking apparatus 20 constructed in accordance with the present invention. In the illustrated embodiment, the first spacecraft 10 is a manned payload-carrying space vehicle such as the NASA Space Shuttle Orbiter, and the second spacecraft 12 is a man-tended space platform which is periodically resupplied by the Shuttle vehicle. The docking apparatus 20 includes a rigid hollow pressure vessel 22 having a first docking port 24 communicating with the interior of the space vehicle 10 and a second docking port 28 communicating with the interior of the space platform 12. A passageway is thereby established between the interiors of the two spacecraft upon spacecraft docking. The docking apparatus also provides a load-bearing mechanical connection between the two spacecraft while they are docked.

The space vehicle 10 has a pressurized crew cabin 30 which provides a shirt-sleeve environment in which the crew carry out the majority of flight control and mission-specific operations. A payload bay 32 is provided behind the cabin 30 for the storage of a payload 34 (shown in phantom in FIG. 1). An aft cabin bulkhead 36 is situated between the cabin 30 and the payload bay 32. Payloads may remain in the payload bay 32 for the duration of the mission, as in the case of an attached payload 38 such as the NASA/ESA Spacelab (shown in FIG. 2), or may be deployed by a remote manipulator system (RMS) 40 carried by the space vehicle 10. A port 42 (FIG. 6) in the aft cabin bulkhead 36 ordinarily allows the crew to pass between the cabin 30 and the payload bay 32. An airlock (not shown) on the cabin side of the aft cabin bulkhead port 42 maintains the integrity of the pressurized cabin environment. The payload bay 32 is enclosed by two longitudinal payload bay doors 44 to protect the payloads during launch and reentry.

The space platform 12 may be of any desired type, but in the preferred embodiment it comprises a mantended facility used for carrying industrial or research payloads. By way of example, the payloads may be adapted to carry out materials processing operations, new product development, or life sciences research. The space platform 12 can be configured as a space-based factory for carrying out one or more of these processes automatically and without human supervision. The space platform 12 also carries the necessary equipment to support its payloads, such as fluid tanks, pumps, batteries, power conditioning equipment, heat exchangers, and so on. The space platform 12 need not be permanently manned, but includes pressurization and life support equipment suitable for shirt-sleeve operation when docked to the space vehicle 10.

The space platform 12 may be placed in near circular earth orbit by means of a single, dedicated launch of the NASA Space Shuttle. To this end, the space platform 12 consists of a number of connected modules 45, 47, each dimensioned to fit in the payload bay 32 of the space vehicle 10. The modules are provided with grapple fixtures 46 which can be engaged by the remote manipulator system (RMS) 40 to allow orbital emplacement and recapture. A docking port 48 is provided on the space platform 12 and is engageable with the docking port 28 of the docking apparatus 20 carried in the payload bay 32 of the space vehicle 10.

The space platform 12 and its materials processing equipment are put into automated operation before being left in orbit by the crew of the space vehicle 10. The space vehicle 10 returns as necessary to resupply the platform payloads and the operational needs of the platform, and to harvest the products manufactured. During these visits, the space vehicle crew temporarily occupy the space platform 12, but are sustained principally by the space vehicle 10.

The space platform 12 is designed to allow modular expansion by adding modules in a side-by-side arrangement. This is achieved by using the space vehicle RMS 40 to capture a space platform 12 which is already in orbit, and then coupling to the captured platform an additional module carried in the payload bay 32. The use of two or more coupled modules allows a multiplication in the capability for materials processing. Docking between the space vehicle 10 and the space platform 12 is essential to the initial deployment of the space platform 12 and to its subsequent resupply and growth. Further details concerning the preferred embodiment of the space platform 12 may be found in the copending U.S. patent application of Caldwell C. Johnson et al., filed on Mar. 20, 1985 under Ser. No. 713,816 and entitled "Spacecraft Operable In Two Alternative Flight Modes"; in the copending U.S. patent application of Maxime A. Faget et al., filed on Mar. 20, 1985 under Ser. No. 713,817 and entitled "Modular Spacecraft System"; and in the copending U.S. patent application of Caldwell C. Johnson et al., filed on Mar. 20, 1985 under Ser. No. 713,882 and entitled "Spacecraft With Articulated Solar Array and Method for Array Deployment", all of which applications are expressly incorporated by reference herein.

The relationship of the space vehicle 10 and the space platform 12 just prior to docking is illustrated on FIG. 1. The space platform 12 has been captured by the RMS 40 and is being brought into contact with the docking apparatus 20. More specifically, the RMS 40 engages a grapple fixture 46 on the space platform 12 and moves the space platform 12 such that the platform docking port 48 makes contact with the docking port 28 of the docking apparatus 20 for attachment thereto. One of several techniques for mating the docking ports 28 and 48 is to reduce to zero the angle A between the central axis 50 of the docking port 48 and the central axis 52 of the docking port 28 as the two docking ports are joined. At the completion of docking, the space platform 12 is fully mated to the docking apparatus 20, and hence to the space vehicle 10, as shown in FIG. 2. In this configuration, the space platform 12 can be resupplied or serviced, or additional modules carried in the payload bay 32 of the space vehicle 10 can be added to the platform.

In a similar fashion, a platform module carried into orbit by the space vehicle 10 as a payload in the payload bay 32 may be lifted by the RMS 40 onto the docking interface 28 as part of the initial deployment procedure. Once docked in this manner, the platform module can be entered by the space vehicle crew through the docking apparatus 20 so that the module can be prepared for release into orbit. Manipulation of the module is accomplished by the RMS 40 in the manner already discussed.

As illustrated in FIG. 2, the pressure vessel 22 may include a tunnel interface port 56 adapted for connection to a tunnel 58. The tunnel 58 communicates with the attached payload 38 carried in the payload bay 32 of the space vehicle 10. When the tunnel interface port 56 (FIG. 1) is attached to the tunnel 58, a passageway is established between the interior of the docking apparatus 20 and the interior of the attached payload 38. Such a passageway allows the crew to travel from the cabin 30 through the docking apparatus 20 and the tunnel 58 to the attached payload 38 to perform a variety of operations therein.

A rear-facing egress port 62 is provided in the docking apparatus 20 above the tunnel interface port 56 to allow crew movement between the docking apparatus 20 and the payload bay 32. The egress port 62 is situated within the volume enclosed by the payload bay doors 44, so that a crew member wearing a pressure suit may pass from the docking apparatus 20 through the egress port 62 into the payload bay 32 while the payload bay doors 44 are closed. Hence, this port functionally replaces the aft cabin bulkhead port 42 (FIG. 6) of the spacecraft 10. A crew member may similarly perform extra-vehicular activities (EVA) by passing first through the egress port 62 and then through the payload bay opening.

As can be appreciated from FIG. 2, the orthogonal axes $x_1$, $y_1$, $z_1$ of the space platform 12 are canted or rotated with respect to the orthogonal axes $x_0$, $y_0$, $z_0$ of the space vehicle 10. This canting of axes results from the fact that the docking ports 24 and 28 of the docking apparatus 20 lie in planes that form an oblique angle with respect to each other. The canted or inclined relationship between the two docked spacecraft assures that the necessary clearance will be maintained between the top of the space vehicle cabin 30 and the adjacent surfaces of the space platform 12. At the same time, however, the uppermost end of the docking apparatus 20 does not extend beyond the space encloseable by the payload bay doors 44. Hence, the docking apparatus 20 can be fully enclosed within the payload bay 32 of the space vehicle 10 without the need for a telescoping structure or any other type of movable or collapsible mechanism.

To preserve the very high margin of safety necessary for docking operations, it is desirable to circumvent the possibility of a type of RMS malfunction known as joint runaway. This damaging malfunction is known to occur when one of the several motor drives which propel the RMS 40 is erroneously commanded by a malfunctioning control to fully rotate. An instance of joint runaway while a space platform 12 is being manipulated by an active RMS 40 may be sufficient to propel the space platform 12 or the attached docking apparatus 20 against the space vehicle 10, causing damage to one or more of these structures.

Figure 3:
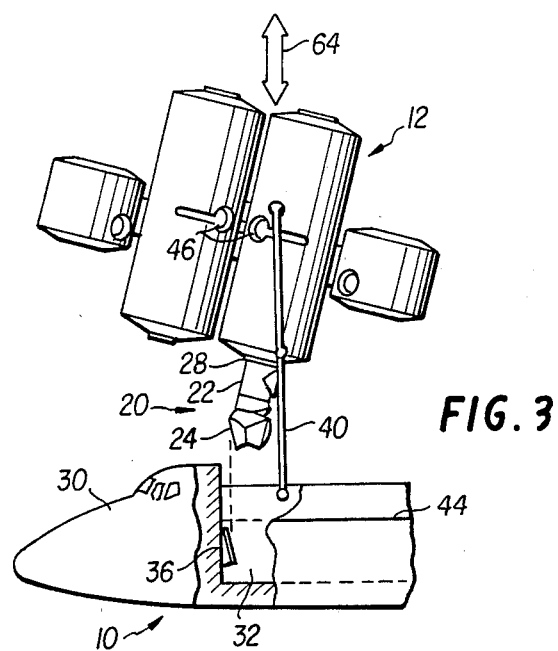
FIGS. 3–5 are partial cutaway views illustrating alternative docking manuevers in which the docking apparatus 20 is carried by the space platform rather than by the space vehicle.
Figure 4:
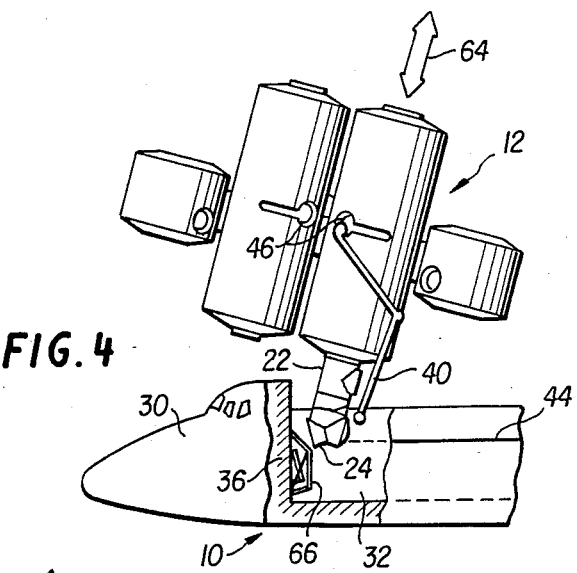
Figure 5:
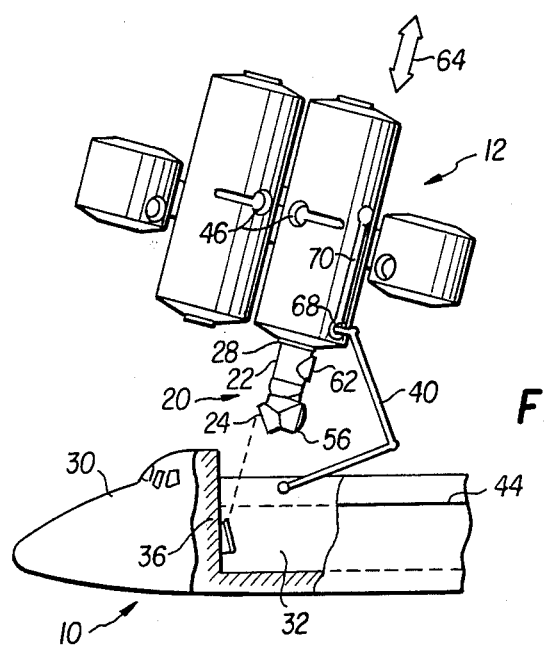

FIGS. 3 through 5 illustrate three possible methods for docking the space platform 12 with the space vehicle 10 when the docking apparatus 20 is carried by the space platform 12, rather than by the space vehicle 10. In FIG. 3, the RMS 40 captures a space platform 12 and retracts such that the plane of the docking port 24 of the docking apparatus 20 approaches the plane of the aft cabin bulkhead port 42 of the space vehicle 10 along a vertical path 64 that is roughly parallel to the aft cabin bulkhead 36. More specifically, the RMS 40 maneuvers the platform 12 to a position in which the grapple fixture 46 is vertically above the shoulder joint of the RMS 40. All joints but one in the RMS 38 are held stationary and the remaining joint is operated only along its pitch axis. This maneuver avoids the possibility of joint runaway in the rotational directions that would cause a collision, and thus offers a greater margin of safety.

FIG. 4 illustrates a docking maneuver in which the RMS 40 maneuvers the space platform 12 in a manner such that the plane of the docking port 24 approaches the plane of the aft cabin bulkhead port 42 along a path 64 which is angled or inclined with respect to the plane of the aft cabin bulkhead 36. Such a maneuver, being more complex than that previously described, is susceptible of causing a damaging collision of the pressure vessel 22 with the aft cabin bulkhead 36. This maneuver is made less critical by the presence of a guard structure 66 at the periphery of the aft cabin bulkhead port 42.

FIG. 5 illustrates a docking maneuver in which the possibility of RMS joint runaway is circumvented. The space platform 12 is equipped with a traveling grapple fitting 68 which may on command be driven along the length of a track 70. The RMS 40 first engages the grapple fitting 68 at the bottom end of the track 70. The RMS 40 manipulates the space platform 12 such that the docking port 24 is immediately above but safely distant from the aft cabin bulkhead port 42. All power to the RMS 40 is then turned off and the RMS braking apparatus is fully activated. The grapple fitting 68 then moves upwardly along the track 70 and away from the space vehicle 10. Because the RMS 40 is immovable due to its fully locked brakes, the motion of the grapple fitting 68 causes a downward motion of the space platform 12. The docking port 24 on the docking apparatus 20 thus approaches the aft cabin bulkhead port 42 for final docking in a controlled manner.

Figure 6:
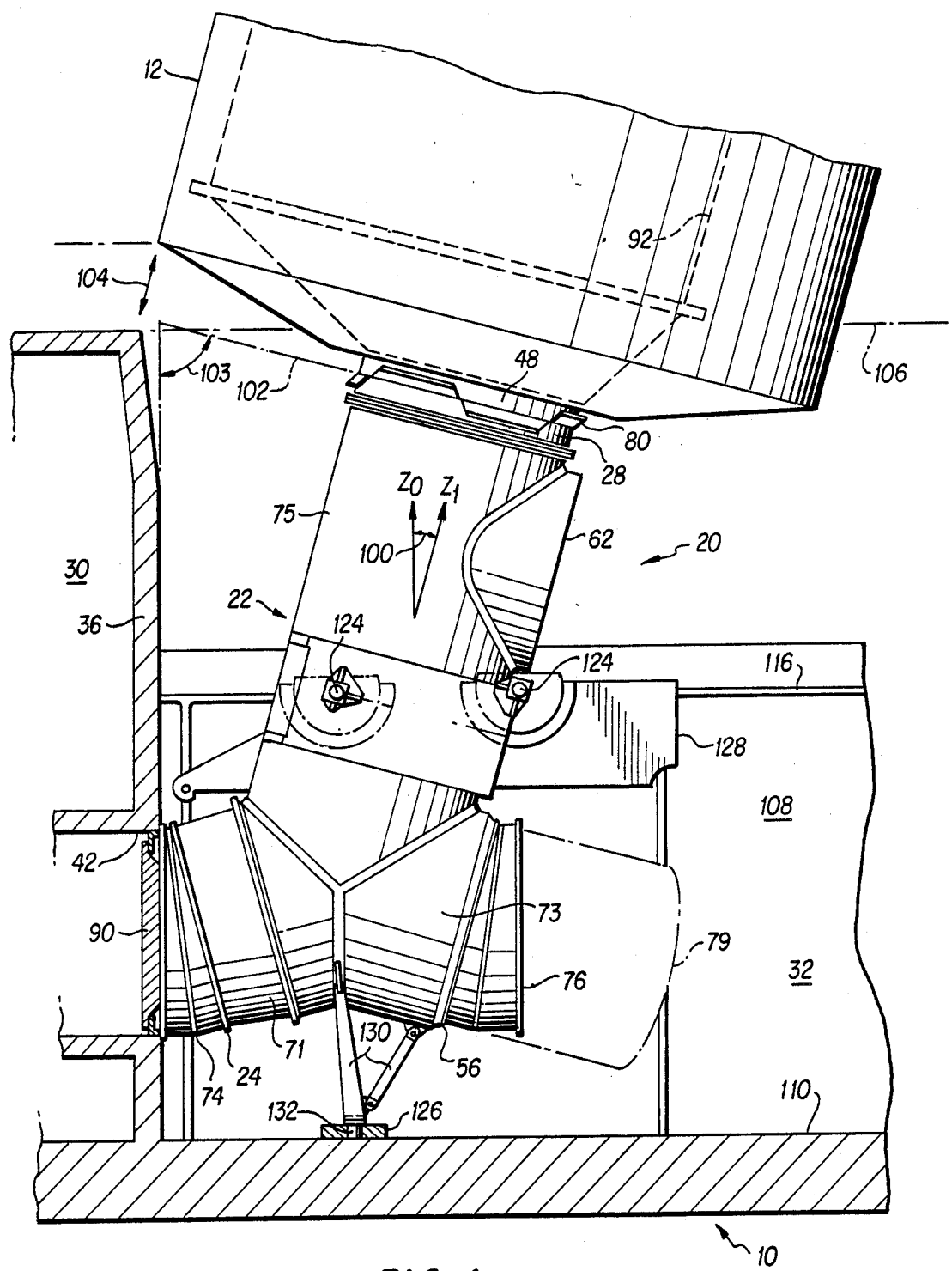
FIG. 6 is a detailed side elevational view of the docking apparatus and the adjacent portions of the space vehicle and space platform.
Figure 7:
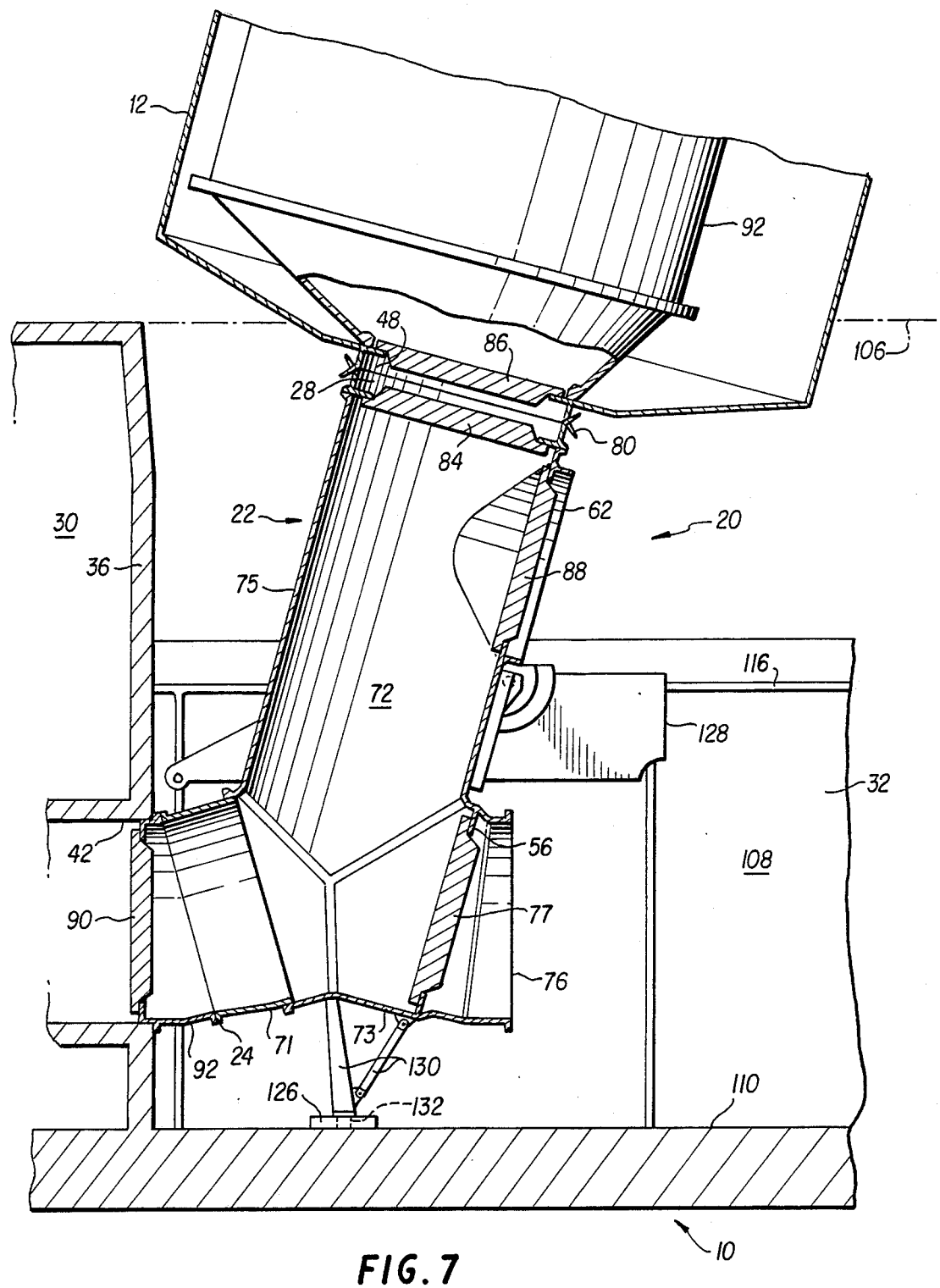
FIG. 7 is a side view similar to that of FIG. 6, with the docking apparatus shown in cross-section.
Figure 8:
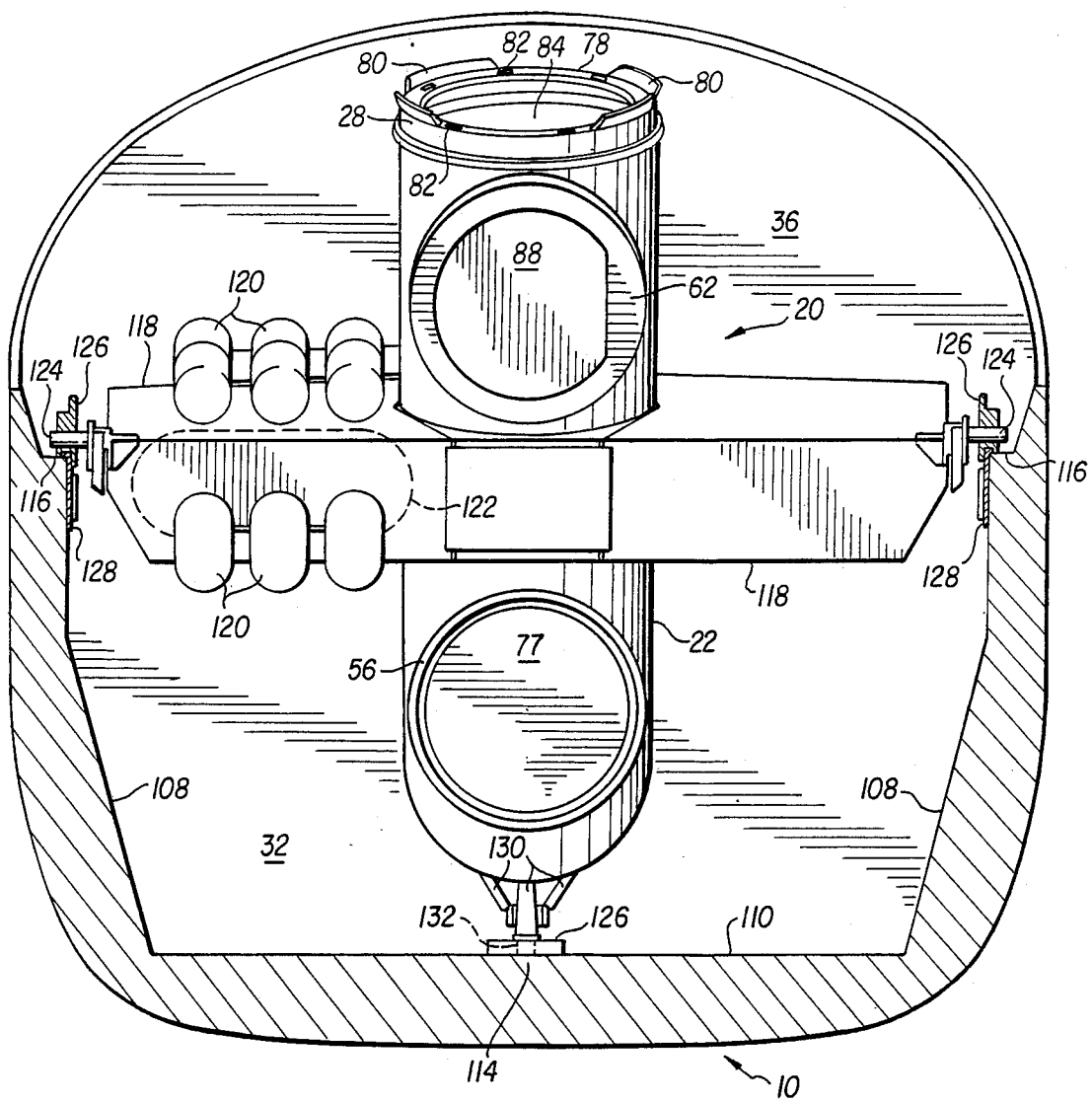
FIG. 8 is an end view of the docking apparatus viewed from the right-hand side in FIG. 6, with the space platform omitted for clarity.

Structural details of the docking apparatus 20 are shown in FIGS. 6–8. The pressure vessel 22 is a generally tubular structure made of welded aluminum or other suitable material, and having an interior passage 72. In the illustrated embodiment, the pressure vessel 22 comprises three hollow cylindrical sections 71, 73 and 75 joined at oblique included angles as shown. The side of the pressure vessel 22 facing the cabin 30 of the space vehicle 10 is fitted with a docking port 24 which includes a bellows connector 74 as shown. The opposite or aft face of the pressure vessel 22 is fitted with a tunnel interface port 56, also including a bellows adapter 76, which may be connected to an optional payload tunnel 58 as discussed previously in connection with FIG. 2. A storage canister 79, shown in phantom, may be positioned on the tunnel interface port 56 in lieu of the tunnel 58. The open end of the canister 79 communicates through the tunnel interface port 56 to the interior of the pressure vessel 22 to receive a variety of equipment or supplies for storage. A pressure-tight hatch 77 is provided within the tunnel interface port 56 to maintain pressurization with the docking apparatus 20 when neither the payload tunnel 58 nor the canister 79 is present.

At the upper end of the docking apparatus 20, a docking port 28 is provided for joining the docking apparatus 20 to the space platform 12 as described earlier. As best seen in FIG. 8, the docking port 28 is fitted with a docking interface comprising a flange 78 which carries four equally-spaced alignment guides 80 to allow docking in clocking increments of 90°. The docking interface also includes eight equally-spaced structural latches 82 which operate according to the latch-on-latch concept, that is, the extended latches of one mechanism engage the retracted latches of the other when the two mechanisms are within a certain distance from each other. Separate capture latches may be employed, if desired, but are not illustrated in the drawings. The docking port 48 of the space platform 12 includes a docking interface of similar construction. The docking port 28 may be opened and closed by means of a pressure-tight hatch 84, and a similar hatch 86 is provided within the docking port 48 of the space platform 12.

The docking apparatus 20 is further provided with the aft-facing egress port 62 which is closed by means of a pressure-tight hatch 88. The egress port 62 allows the crew to access the payload bay 32 of the space vehicle 10 when the tunnel interface port 56 is fitted with a payload tunnel or storage canister.

The hatches in the space platform docking port 28, egress port 62, and tunnel interface port 56 preserve the pressurized environment within the pressure vessel 22. These hatches maintain a pressure-tight seal at the respective port or interface until removed for passage to or from the pressure vessel 22. The hatches may, if desired, be provided with viewports (not shown). The pressure vessel 22 is connected to the space vehicle 10 by the mechanical joining of the docking port 24 to the bellows 74 which surrounds the aft cabin bulkhead port 42. The bellows 74 adjusts to meet the docking port 24 so as to compensate for minor misalignment of the port 24 during docking maneuvers, and may be retracted as a preliminary step in undocking maneuvers. The bellows 74 also adjusts to compensate for thermally-induced structural contraction and expansion of the docking apparatus 20 with respect to the aft cabin bulkhead port 42. The bellows 74 may be temporarily attached to the port 24 by using any of a variety of quick-release, spaceflight-qualified fasteners. The pressure vessel 22 is connected to the space platform 12 by the mechanical joining of the docking interfaces associated with the docking ports 28 and 48, as described previously. The space platform 12 includes as its primary structure an inner pressure hull 92, the interior of which is reached by passage from the space vehicle crew cabin 30 through the pressure vessel 22 and the docking ports 28 and 48.

As shown in FIG. 6, the docking apparatus 20 produces an included cant angle 100 of about 20° between the orthogonal geometric axes $x_0, y_0, z_0$ of the space vehicle 10 and the orthogonal geometric axes $x_1, y_1, z_1$ of the attached space platform 12. This cant angle 100 results from the positioning of the docking interface plane 102 at an oblique included angle 103 with respect to the plane of the docking port 24. Consequently, the interface plane 102 between the two docking ports 28 and 48 extends above the highest point of the aft cabin bulkhead 36. As a result, the space platform 12 may be attached to the docking apparatus 20 while maintaining a predetermined minimum clearance 104 between the most proximate points of the space platform 12 and the space vehicle 10. At the same time, the docking apparatus 20 is adapted to fit entirely within the confines of the payload bay 32, that is, within the volume defined by the aft cabin bulkhead 36, the payload bay roofline 106, the payload bay interior walls 108, and the deck 110. The docking apparatus 20, when attached to the space vehicle 10, therefore does not interfere with the closing of the payload bay doors 44 and hence does not threaten the safe return of the space vehicle 10 to earth. It will be observed that, when the space platform 12 is docked to the space vehicle 10, a portion of the space platform 12 extends below the roofline 106 into the payload bay 32. The space platform 12 is dimensioned to preclude the possibility of mechanical interference with any payloads which may be carried in the payload bay 32.

The docking apparatus 20 is rigidly supported by several structural members which secure the pressure vessel 22 to the payload bay keel 114 and the sills 116. Support members 118 extend laterally from the midsection of the pressure vessel 22 toward the sills 116 of the payload bay interior walls 108. One or more optional storage tanks 120 and 122 may be attached to the support members 118. Each support member 118 terminates in two spaced-apart side trunnions 124 which extend from the interior of the support member 118. Each side trunnion 124 is received by a payload retention latch 126 on a bridge fitting 128. Depending struts 130 are secured to the lower section of the pressure vessel 22 and meet at their lowermost points in a keel trunnion 132. A payload retention latch 126 mounted at the keel 114 secures the keel trunnion 132. The payload retention latches 126 are adapted to receive and secure the side trunnions 124 and the keel trunnion 132 during pre-flight installation of the docking apparatus 20. Alternatively, the latches 126 are capable of receiving and securing the side trunnions 124 and the keel trunnion 132 during the docking maneuvers of FIGS. 3-5. The latches 126 allow a controlled release of the side trunnions 124 and the keel trunnion 132 during undocking maneuvers.

Although the present invention has been described with reference to a preferred embodiment, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. A spacecraft comprising a crew cabin, a payload bay, a bulkhead between said crew cabin and said payload bay, a port in said bulkhead for allowing crew passage between said crew cabin and said payload bay, at least one payload bay door communicating between said payload bay and the exterior of the spacecraft, and a docking apparatus carried by said spacecraft for joining the spacecraft to a second spacecraft, said docking apparatus comprising:
 a rigid pressure vessel having first and second ports and an interior passage extending therebetween, said first port communicating with said bulkhead port; and
 a docking interface associated with said second port for coupling the docking apparatus to the second spacecraft;
 said first port and said docking interface being positioned on said pressure vessel in a manner such that the respective planes thereof form an oblique included angle with respect to each other, such that said second spacecraft assumes a canted position with respect to the first spacecraft upon coupling with the docking interface so that a portion of the second spacecraft extends into the open payload bay of the first spacecraft, and the dimensions of the docking apparatus being such that the docking apparatus is completely enclosed within the payload bay of the first spacecraft when the payload bay door is closed.

2. The spacecraft of claim 1, wherein said docking interface comprises a flange carrying a plurality of spaced circumferential alignment guides and a plurality of structural latches.

3. The spacecraft of claim 1, wherein said bulkhead port and said second port each include a pressure-tight hatch.

4. The spacecraft of claim 1, wherein said docking apparatus further comprises a tunnel interface port carried by said pressure vessel and communicating with said interior passage.

5. The spacecraft of claim 4, wherein said tunnel interface port includes a pressure-tight hatch.

6. The spacecraft of claim 4, further comprising a storage cannister coupled to said tunnel interface port.

7. The spacecraft of claim 4, wherein said docking apparatus further comprises an egress port carried by said pressure vessel and communicating between the interior passage of the pressure vessel and said payload bay.

8. The spacecraft of claim 7, wherein said egress port includes a pressure-tight latch.

9. The spacecraft of claim 1, further comprising a payload retention system in said payload bay for securing said docking apparatus to the spacecraft, an airlock between said crew cabin and said bulkhead port, first and second payload bay doors adapted for enclosing the payload bay, and a remote manipulator arm usable for docking the second spacecraft to the first spacecraft.

10. The spacecraft of claim 9, further comprising a support structure attached to the docking apparatus and to the payload retention system.

11. The spacecraft of claim 10, further comprising at least one storage tank carried by said support structure.

12. The spacecraft of claim 1, wherein the rigid pressure vessel is made up of at least two tubular sections joined to each other at an oblique included angle.

13. The spacecraft of claim 1, wherein the docking apparatus is detachable from said bulkhead port.

14. A method for docking first and second spacecraft, said first spacecraft comprising a crew cabin, a payload bay, a bulkhead between said crew cabin and said payload bay, a port in said bulkhead for allowing crew passage between said crew cabin and said payload bay, at least one payload bay door opening from the payload bay to the outside of the spacecraft, and a docking apparatus carried in the payload bay of the first spacecraft, said docking apparatus being attached at one end to the bulkhead port of said first spacecraft and being attachable at the other end to a docking port of the second spacecraft, said method comprising the following steps:
bringing the first and second spacecraft into close proximity;
uncovering the docking apparatus by opening the payload bay door of the first spacecraft;
maneuvering at least one of the first and second spacecraft in a manner such that the second spacecraft assumes a canted position with respect to the first spacecraft, with a portion of the second spacecraft extending into the open payload bay of the first spacecraft; and
coupling the docking port of the second spacecraft to the docking apparatus in order to maintain the second spacecraft in said canted position.

15. The docking method of claim 14, wherein the first spacecraft includes a remote manipulator arm, and wherein the steps of maneuvering at least one of the first and second spacecraft and coupling the docking port of the second spacecraft to the docking apparatus are carried out using said remote manipulator arm.

16. A method for docking first and second spacecraft, said first spacecraft comprising a crew cabin, a payload bay, a bulkhead between said crew cabin and said payload bay, a port in said bulkhead for allowing crew passage between said crew cabin and said payload bay, at least one payload bay door opening from the payload bay to the outside of the spacecraft, and a docking apparatus, said docking apparatus being attached at one end to the second spacecraft and being attachable at the other end to the bulkhead port of said first spacecraft, said method comprising the following steps:
bringing the first and second spacecraft into close proximity;
uncovering the bulkhead port by opening the payload bay door of the first spacecraft;
maneuvering at least one of the first and second spacecraft in a manner such that the second spacecraft assumes a canted position with respect to the first spacecraft, with a portion of the second spacecraft extending into the open payload bay of the first spacecraft; and
coupling the bulkhead port of the first spacecraft to the docking apparatus in order to maintain the second spacecraft in said canted position.

17. The docking method of claim 16, wherein the first spacecraft includes a remote manipulator arm, and wherein the steps of maneuvering at least one of the first and second spacecraft and coupling the docking apparatus to the bulkhead port of the first spacecraft are carried out using said remote manipulator arm.

18. A method for docking two spacecraft, one of said spacecraft having a remote manipulator arm and the second spacecraft having a grapple fitting movable along a track and engageable by said remote manipulator arm, said method comprising the following steps:
operating said remote manipulator arm to engage said grapple fitting;
locking the remote manipulator arm in a fixed position;
moving the grapple fitting along said track in a direction away from the first spacecraft in order to propel the second spacecraft toward the first spacecraft; and
establishing a docked connection between said first and second spacecraft.

* * * * *